United States Patent
Zhao

(10) Patent No.: US 9,371,019 B2
(45) Date of Patent: Jun. 21, 2016

(54) CHILD SEAT AND METHOD OF FABRICATING THE SAME

(75) Inventor: Guang-Hui Zhao, Central Hong Kong (HK)

(73) Assignee: Wonderland Nurserygoods Company Limited, Hong Kong (HK)

(*) Notice: Subject to any disclaimer, the term of this patent is extended or adjusted under 35 U.S.C. 154(b) by 397 days.

(21) Appl. No.: 13/587,391

(22) Filed: Aug. 16, 2012

(65) Prior Publication Data

US 2013/0049420 A1 Feb. 28, 2013

(30) Foreign Application Priority Data

Aug. 30, 2011 (CN) .......................... 2011 1 0269948

(51) Int. Cl.
| A47D 1/10 | (2006.01) |
| B29D 22/00 | (2006.01) |
| B60N 2/28 | (2006.01) |
| B29C 45/17 | (2006.01) |
| B60N 2/68 | (2006.01) |

(52) U.S. Cl.
CPC .......... B60N 2/2866 (2013.01); B29C 45/1704 (2013.01); B60N 2/686 (2013.01)

(58) Field of Classification Search
CPC ..... B60N 2/5664; B60N 2/2866; B60N 2/686
USPC ............... 297/452.66, 452.15, 452.46, 250.1
See application file for complete search history.

(56) References Cited

U.S. PATENT DOCUMENTS

| 3,669,495 | A | * | 6/1972 | Von Rudgisch | ........... | 297/451.11 |
| 4,350,390 | A | * | 9/1982 | Ogawa | ..................... | A47C 5/00 |
| | | | | | | 297/452.18 |
| 4,521,052 | A | * | 6/1985 | Cone | ........................ | A47D 1/02 |
| | | | | | | 297/1 |
| 5,013,179 | A | * | 5/1991 | Rothmund | ............... | A47C 3/12 |
| | | | | | | 403/335 |
| 5,522,645 | A | * | 6/1996 | Dahlbacka | ............. | B60N 2/449 |
| | | | | | | 297/452.14 |
| 6,070,942 | A | * | 6/2000 | Barton | ..................... | A47C 4/54 |
| | | | | | | 297/180.15 |
| 6,546,578 | B1 | | 4/2003 | Steinmeier | | |
| 7,278,683 | B2 | * | 10/2007 | Williams et al. | ........... | 297/250.1 |
| 8,590,978 | B2 | * | 11/2013 | Jaranson et al. | ......... | 297/452.15 |
| 2006/0208543 | A1 | | 9/2006 | Spence et al. | | |
| 2007/0170759 | A1 | | 7/2007 | Nolan et al. | | |

FOREIGN PATENT DOCUMENTS

| CN | 102059963 A | 5/2011 |
| DE | 19527352 A1 | 1/1997 |
| EP | 2233352 A1 | 9/2010 |
| JP | 52050831 B | 4/1952 |
| JP | 2001113999 A | 4/2001 |
| JP | 2004359052 A | 12/2004 |
| KR | 20080003588 U | 8/2008 |
| WO | 2007076536 A1 | 7/2007 |

* cited by examiner

Primary Examiner — David R Dunn
Assistant Examiner — Tania Abraham
(74) Attorney, Agent, or Firm — David I. Roche; Baker & McKenzie LLP

(57) ABSTRACT

A child seat includes an upper surface adapted to receive a child in a sitting position, and a surrounding sidewall having a top connected with the upper surface, the upper surface including a plurality of perforations, the surrounding sidewall being formed integrally with the upper surface, and the surrounding sidewall and the upper surface at least partially delimiting an inner cavity below the upper surface.

7 Claims, 7 Drawing Sheets

CHILD SEAT AND METHOD OF FABRICATING THE SAME

CROSS-REFERENCE TO RELATED APPLICATION

This application claims priority to Chinese Patent Application No. 201110269948.3 filed on Aug. 30, 2011.

BACKGROUND

1. Field of the Invention

The present inventions relate to child seats such as booster seats, and method of fabricating the same.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

However, as the child grows up, the space of the child safety seat may no longer be adapted to receive the bigger size of the child's body. For an older child, a booster seat may be placed on the vehicle passenger's seat to increase the height of the seat where the child sits. After the child sits on the booster seat, the seatbelt of the vehicle can be used to restrain the child. Currently, most booster seats are made of rigid plastics that lack elastic and cushioning properties. Therefore, there is a need for a design of a child seat that can have improved elastic and cushioning properties, and address at least the foregoing issues.

SUMMARY

The present application describes a child seat that can have improved elastic and cushioning properties, and is lightweight and can be manufactured with a reduced material cost. The child seat includes an upper surface adapted to receive a child in a sitting position, and a surrounding sidewall having a top connected with the upper surface, the upper surface including a plurality of perforations, the surrounding sidewall being formed integrally with the upper surface, and the surrounding sidewall and the upper surface at least partially delimiting an inner cavity below the upper surface.

A method of fabricating the child seat is also described. The method includes injecting a plastic material into a mold to form a shape of the child seat, and injecting air into the mold so as to form at least a hollow portion in a material thickness of the surrounding sidewall.

DETAILED DESCRIPTION OF THE EMBODIMENTS

Figure 1:
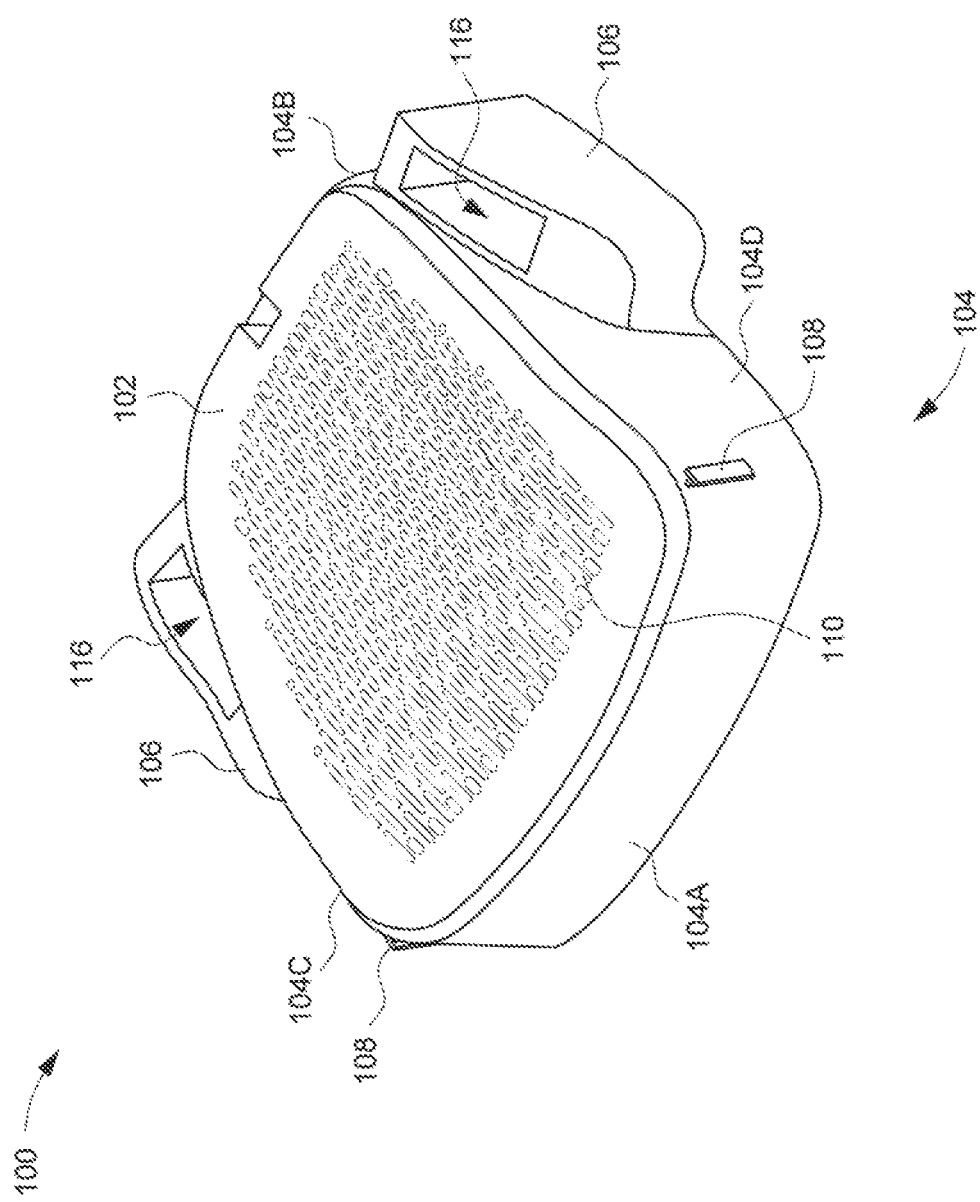
FIG. 1 is a perspective view illustrating an embodiment of a child seat.
Figure 2:
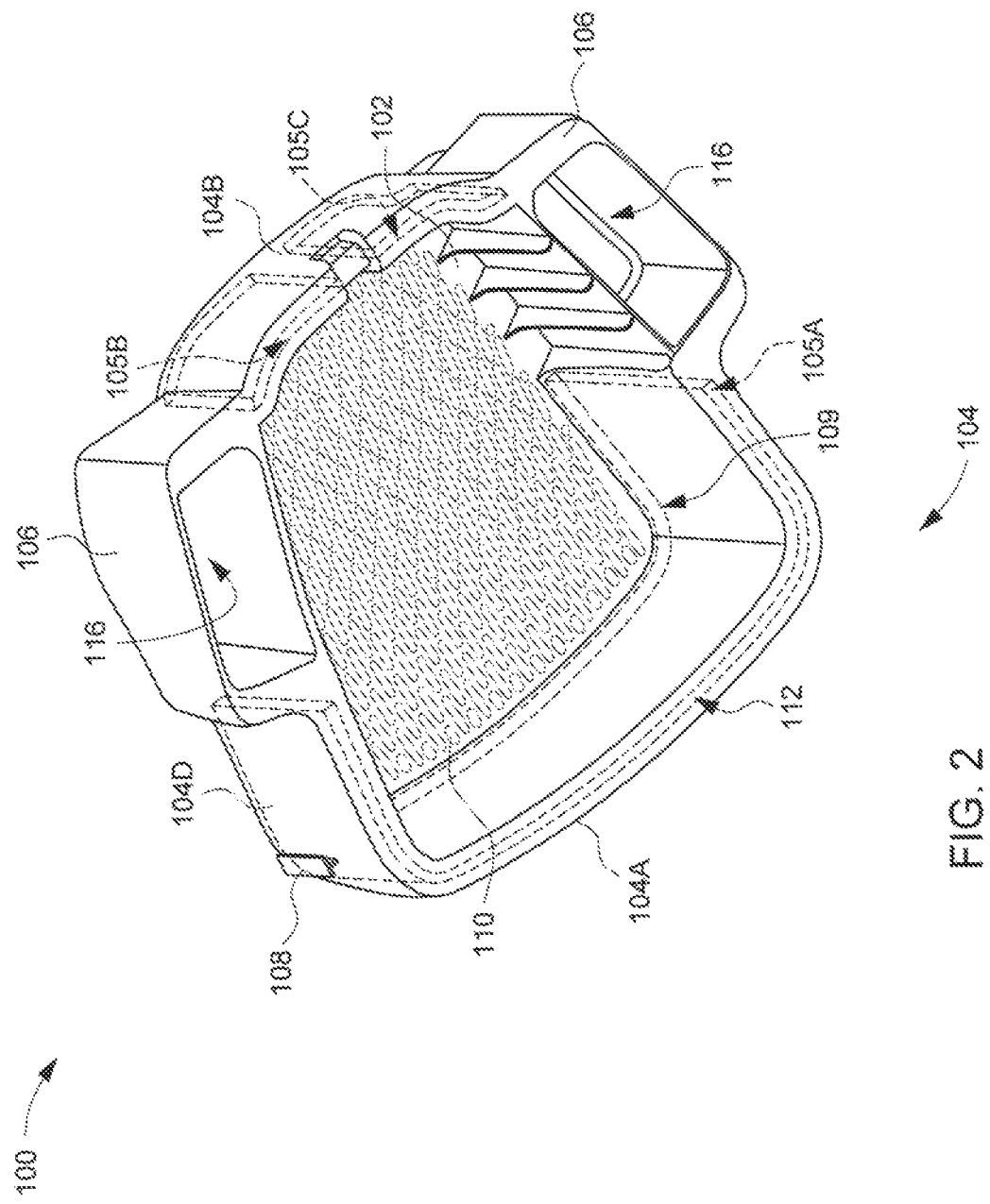
FIG. 2 is a schematic view illustrating a bottom of the child seat.
Figure 3:
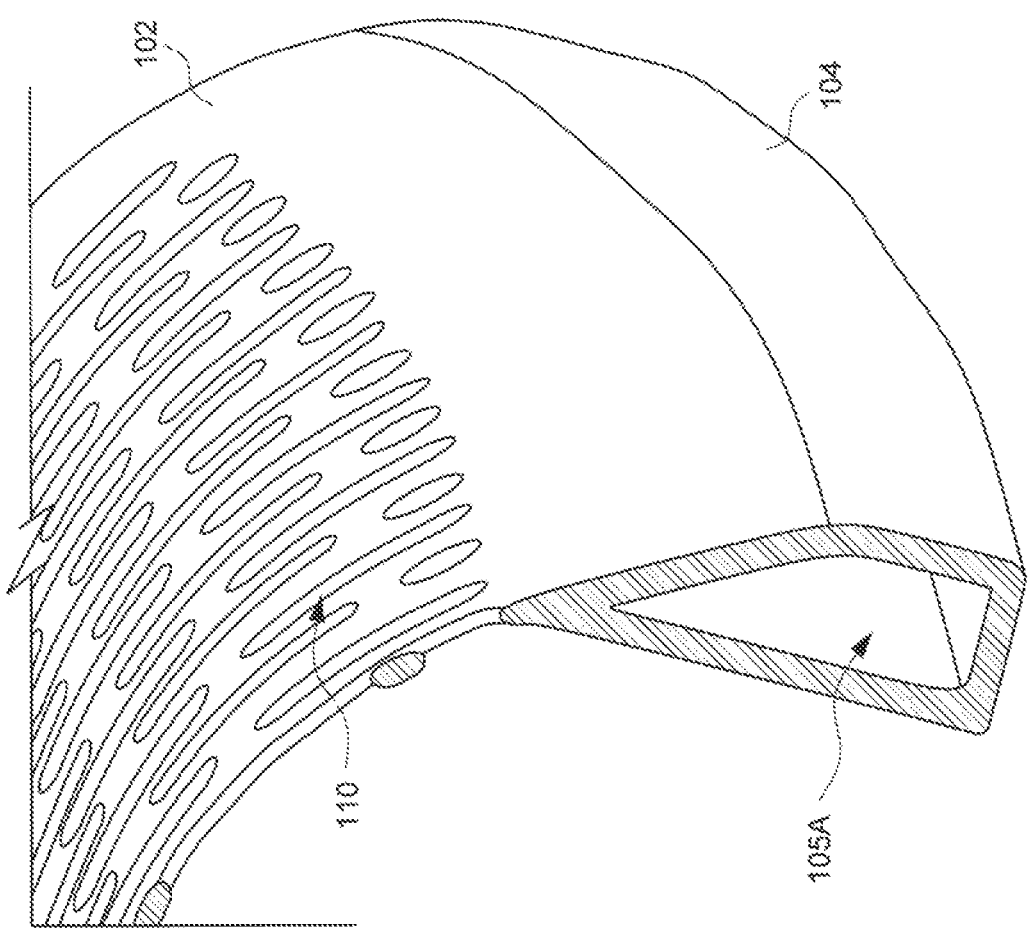
FIG. 3 is a partial cross-sectional view of a portion of the child seat shown in FIG. 1.

FIG. 1 is a perspective view illustrating an embodiment of a child seat 100, FIG. 2 is a schematic view illustrating a bottom of the child seat 100, and FIG. 3 is a partial cross-sectional view of a portion of the child seat 100. The child seat 100 can include an upper surface 102, a surrounding sidewall 104, two sockets 106, and two attachment ribs 108 each having a T-shaped section. In one embodiment, the upper surface 102, the surrounding sidewall 104, the sockets 106 and the attachment ribs 108 can be formed integrally with the child seat 100 by plastic molding. The upper surface 102 can be joined with and a top of the surrounding sidewall 104. The upper surface 102 and the surrounding sidewall 104 can define at least partially an inner cavity 109 that is upwardly delimited by the upper surface 102, surrounded by the surrounding sidewall 104 and opened downwardly. A lower end of the surrounding sidewall 104 can provide a resting support that can be in contact with a surface on which the child seat 100 is placed.

The upper surface 102 can provide a support surface on which a child can sit. The upper surface 102 can include a plurality of perforations 110 that communicate with the inner cavity 109. This construction may increase the elasticity and cushioning properties of the upper surface 102, and facilitate air circulation and breathability through the upper surface 102, making it more comfortable in use. In one embodiment, the region of the perforations 110 can substantially occupy the total surface area of the upper surface 102 except a peripheral area thereof. For example, the region of the perforations 110 (including the perforations 110 themselves and the areas between the perforations 110) can be at least greater than 50% of the surface area of the upper surface 102, and/or occupy the effective surface area where a child sits on the upper surface 102.

As shown in FIGS. 1-3, the surrounding sidewall 104 can be hollow in structure. For example, the material of the surrounding sidewall 104 can define a first hollow portion 105A, a second hollow portion 105B and a third hollow portion 105C spaced apart from one another (as shown with phantom lines in FIG. 2). These hollow portions can be substantially enclosed in the material thickness of the surrounding sidewall 104 taken between an inner surface of the sidewall 104 adjacent to the inner cavity 109 and an opposite outer surface of the sidewall 104. The hollow portions can increase the elasticity of the surrounding sidewall 104, and reduce the amount of material used to form the child seat 100. The surrounding sidewall 104 can include a front wall portion 104A, rear wall portion 104B, left wall portion 104C and right wall portion 104D. The front wall portion 104A and the rear wall portion 104B can respectively connect between the left and right wall portions 104C and 104D. The first hollow portion 105A can extend continuously along an interior of the front wall portion 104A, the left wall portion 104C and the right wall portion 104D. The second hollow portion 105B and the third hollow portion 105C can respectively extend along an interior of the rear wall portion 104B spaced apart from each other.

The two sockets 106 can be respectively arranged at the left wall portion 104C and the right wall portion 104D at locations near the rear wall portion 104B. Each socket 106 can include a through-hole 116 that extends from a top to a bottom of the socket 106 and is opened at the top and bottom. According the needs, the sockets 106 can respectively receive the assembly of armrests.

The attachment ribs 108 can be respectively connected with the left wall portion 104C and the right wall portion 104D at locations near the front wall portion 104A. According to the needs, a cup holder can be installed with the child seat 100 by fastening with one attachment rib 108. The cup holder may be used to place a drink container or any accessory items.

The child seat 100 can be used as a booster seat to increase a height at which the child sits. According to the needs, different convenience accessory items may also be mounted with the child seat 100.

Figure 4:
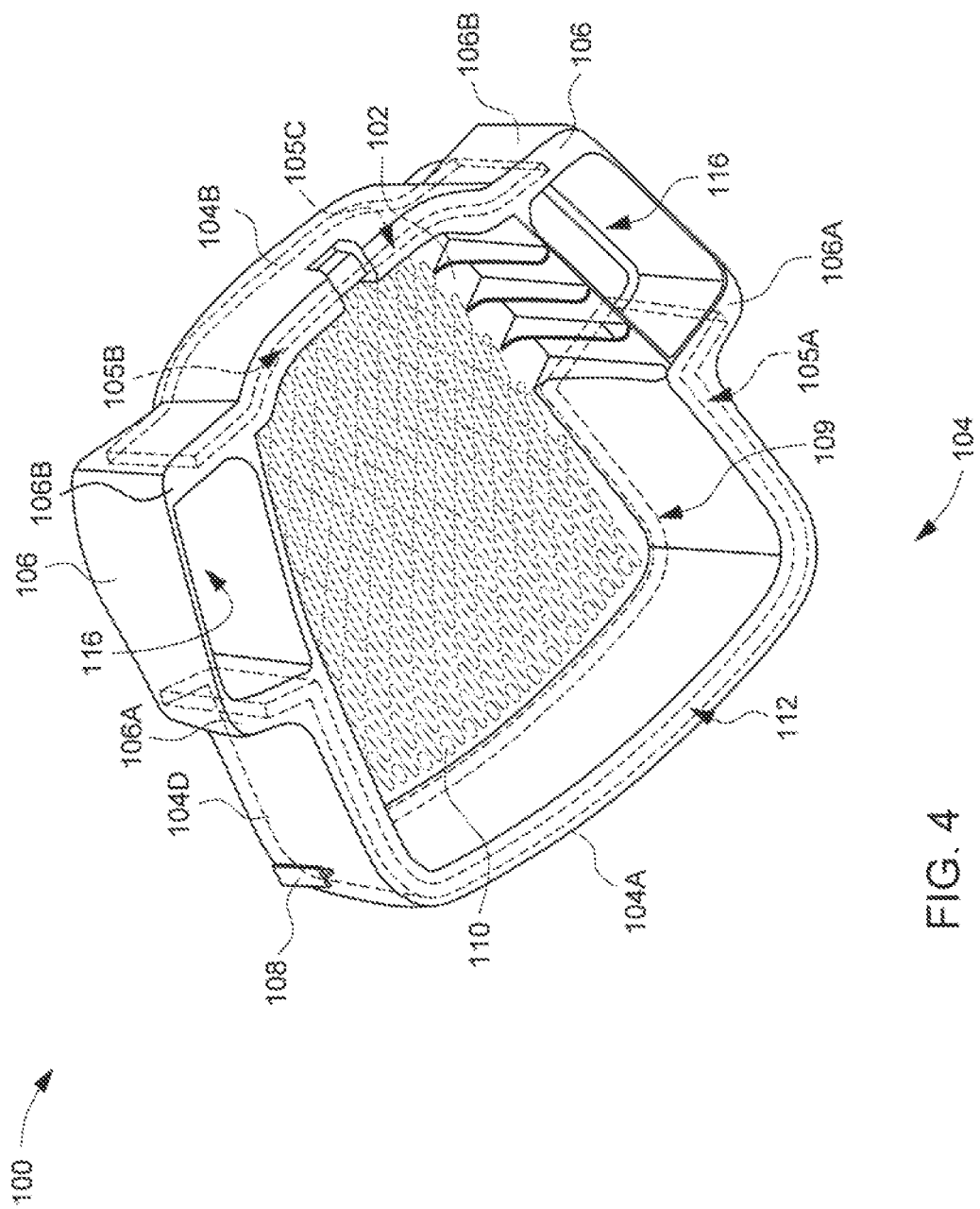
FIG. 4 is a schematic view illustrating another embodiment of a child seat.

FIG. 4 is a schematic view illustrating another embodiment of the child seat 100. The embodiment shown in FIG. 4 is very similar to the embodiment described previously. One difference lies in the configuration of the hollow portions in the surrounding sidewall 104. The first hollow portion 105A can respectively extend along an interior of the front wall portion 104A, the left wall portion 104C, the right wall portion 104D, and front walls 106A of the sockets 106. The second and third hollow portions 105B and 105C can communicate with each other, and extend along an interior of the rear wall portion 104B and rear walls 106B of the sockets 106.

Figure 5:
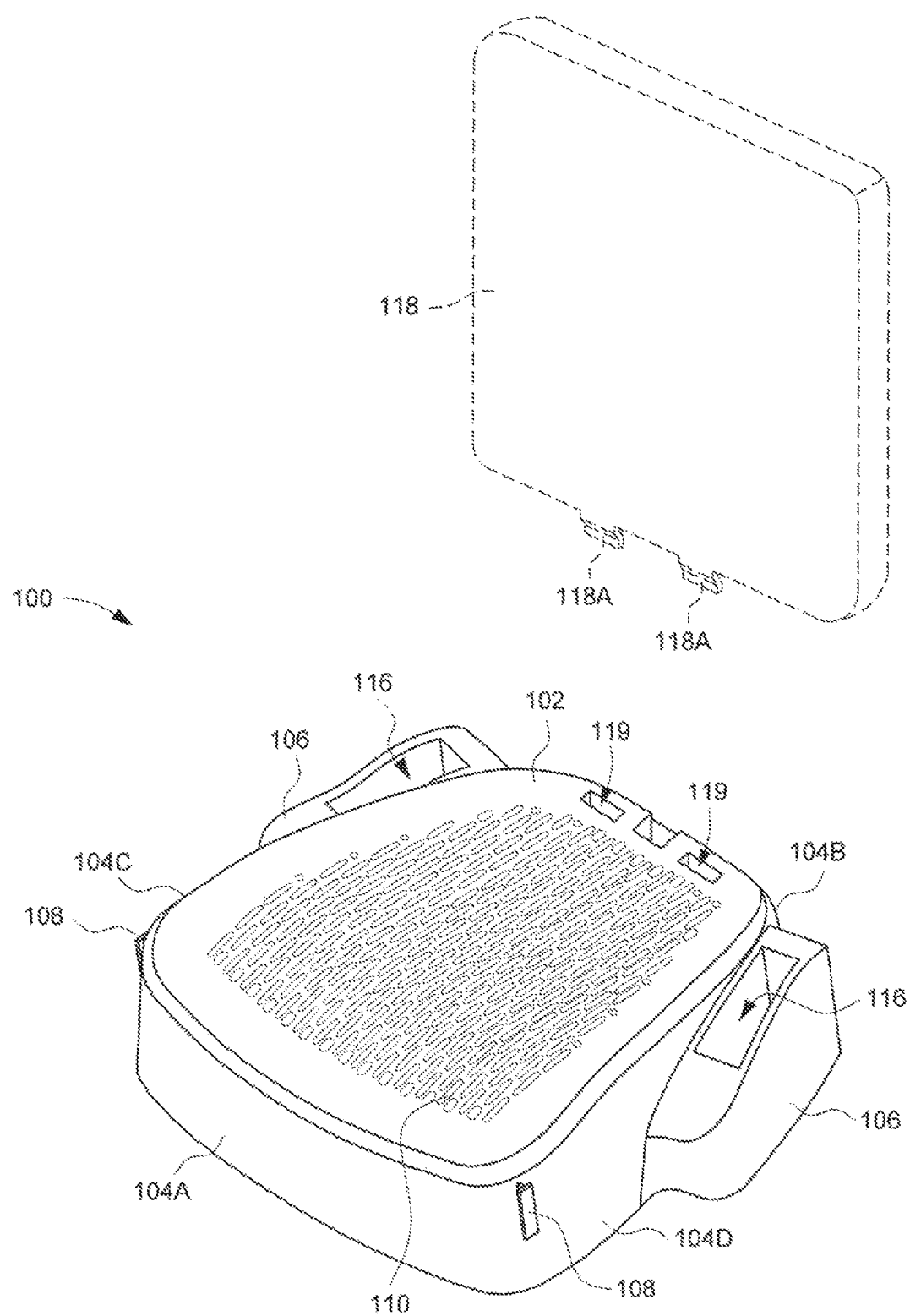
FIG. 5 is a schematic view illustrating the child seat provided with a backrest.

FIG. 5 is a schematic view illustrating the child seat 100 provided with a backrest 118. The backrest 118 can have a lower end provided with two latching structures 118A of bent shapes. The upper surface 102 can include two catching slots 119 adjacent to the rear wall portion 104B. The latching structures 118A can respectively engage with the catching slots 119 to fasten the backrest 118 with the child seat 100.

Figure 6:
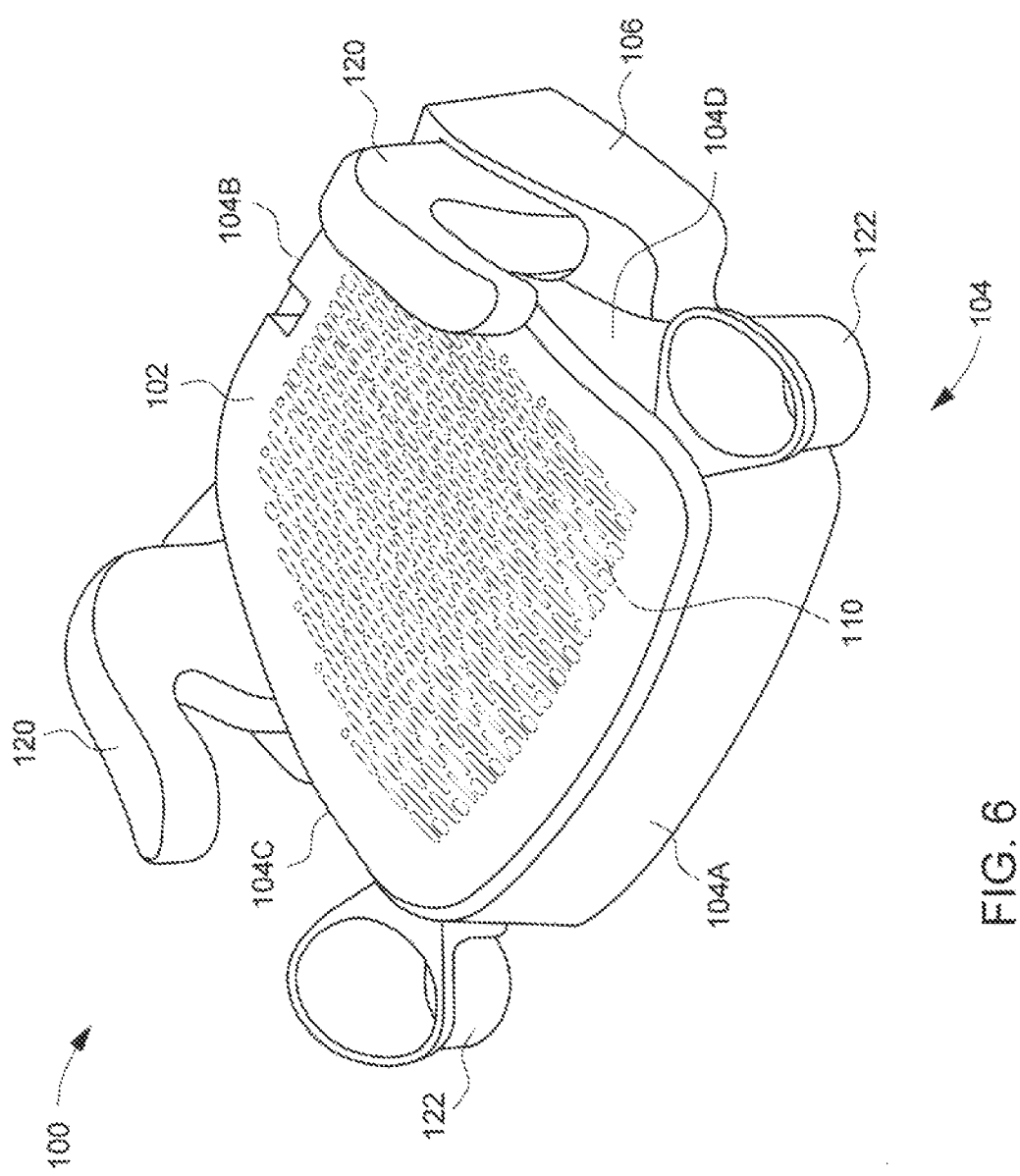
FIG. 6 is a schematic view illustrating the child seat provided with armrests and cup holders.

FIG. 6 is a schematic view illustrating the child seat 100 provided with armrests 120 and cup holders 122. The armrests 120 can be respectively inserted from the bottom or top of the sockets 106, until the armrests 120 extend properly outward from the top of the armrests 120 and become engaged and fastened with the sockets 106. Each cup holder 122 can have a catching slot (not shown) through which an attachment rib 108 can engage to fasten the cup holder 122 with the child seat 100 in a detachable manner at the left and/or right side.

When they are not installed for use with the child seat 100, the armrests 120 and the cup holders 122 can conveniently stored in the inner cavity 109 (as shown in FIG. 2) below the upper surface 102 to reduce the volume occupied by the child seat 100.

Figure 7:
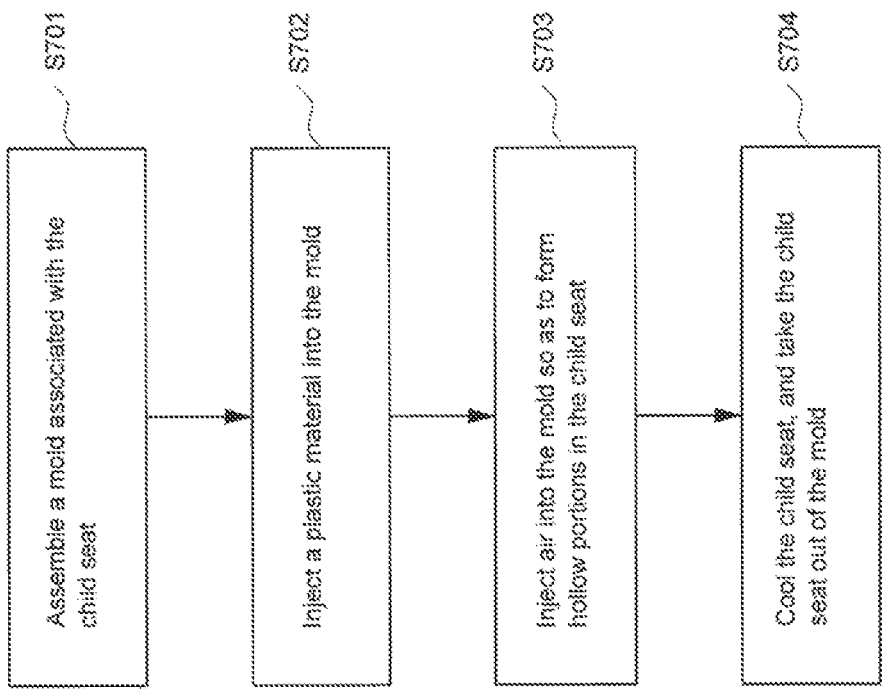
FIG. 7 is a flowchart of exemplary method steps for forming a child seat.

FIG. 7 is a flowchart of exemplary method steps of fabricating the child seat 100. A mold associated with the child seat 100 can be first assembled in step S701. In step S702, a plastic material then can be injected into the mold to form the shape of the child seat 100 including the upper surface 102 and the surrounding sidewall 104, the upper surface 102 including the perforations 110, the surrounding sidewall 104 being upwardly connected with the upper surface 102. In step S703, air can be injected into the mold so as to form hollow portions in the child seat, such as the first, second and third hollow portions 105A, 105B and 105C in the surrounding sidewall 104. As shown previously, the first hollow portion 105A can extend along an interior of the front wall portion 104A, the left wall portion 104C and the right wall portion 104D, whereas the second and third hollow portions 105B and 105C can respectively extend along an interior of the rear wall portion 104B. In step S704, the child seat 100 then can be cooled down, and extracted from the mold.

The child seats described herein can be formed integrally by plastic molding with a reduced material cost. By injecting air during molding, hollow portions can be formed in the material thickness of the seat sidewall. As a result, the child seat can be lightweight, and have improved elastic and cushioning characteristics. The compact shape of the child seat can also advantageously facilitate product packaging and shipment. Moreover, providing perforations through the upper surface can facilitate breathability, and provide comfort.

Realizations of the child seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child seat comprising an upper surface adapted to receive a child in a sitting position, and a surrounding sidewall having a top connected with the upper surface, the upper surface including a plurality of perforations, the surrounding sidewall being formed integrally with the upper surface, and the surrounding sidewall and the upper surface at least partially delimiting an inner cavity below the upper surface, the upper surface at least partially covering upwardly the inner cavity, and the perforations being located above the inner cavity and communicating with the inner cavity, wherein the surrounding sidewall includes a front wall portion, a rear wall portion, and a left wall portion and a right wall portion respectively connected with the front wall portion at two corners of the child seat, and the surrounding sidewall further includes at least one hollow portion having a single void substantially enclosed in a material thickness of the surrounding sidewall, the material thickness being taken from an inner surface of the sidewall adjacent to the inner cavity and an opposite outer surface of the sidewall, and the single void of the hollow portion extending along the front wall portion and turning about the two corners into the left and right wall portions, the surrounding sidewall further having a bottom portion integrally formed therewith that downwardly closes the single void of the hollow portion.

2. The child seat according to claim 1, wherein the perforations are distributed over more than about 50% of the upper surface.

3. The child seat according to claim 1, further including a socket configured to receive the installation of an armrest.

4. The child seat according to claim 3, wherein the socket includes a through-hole through which the armrest engages when the armrest is assembled with the child seat.

5. The child seat according to claim 4, wherein the through-hole extends from a top to a bottom of the socket.

6. The child seat according to claim 1, wherein the surrounding sidewall includes an attachment rib adapted to engage with a cup holder.

7. The child seat according to claim 1, wherein the inner cavity is entirely opened downwardly.

* * * * *